United States Patent
Shan

(10) Patent No.: US 8,180,664 B2
(45) Date of Patent: May 15, 2012

(54) METHODS AND SYSTEMS FOR FORECASTING WITH MODEL-BASED PDF ESTIMATES

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2559 days.

(21) Appl. No.: 11/001,453

(22) Filed: Dec. 1, 2004

(65) Prior Publication Data

US 2006/0116920 A1  Jun. 1, 2006

(51) Int. Cl.
*G06Q 10/00* (2006.01)
(52) U.S. Cl. .................................. 705/7.31
(58) Field of Classification Search .............. 705/7.31
See application file for complete search history.

(56) References Cited

U.S. PATENT DOCUMENTS

| | | | |
|---|---|---|---|
| 5,257,206 A * | 10/1993 | Hanson ........................ 700/273 |
| 5,712,985 A | 1/1998 | Lee et al. |
| 6,038,540 A * | 3/2000 | Krist et al. ................... 705/7.33 |
| 6,370,437 B1 * | 4/2002 | Carter et al. .................. 700/52 |
| 6,381,504 B1 * | 4/2002 | Havener et al. ............... 700/44 |
| 6,460,035 B1 * | 10/2002 | Siegwart ....................... 707/737 |
| 6,577,962 B1 * | 6/2003 | Afshari ........................ 702/61 |
| 6,606,615 B1 * | 8/2003 | Jennings et al. .............. 706/45 |
| 6,611,726 B1 * | 8/2003 | Crosswhite ................... 700/99 |
| 6,625,569 B2 * | 9/2003 | James et al. .................. 702/183 |
| 6,731,990 B1 * | 5/2004 | Carter et al. .................. 700/52 |
| 6,738,682 B1 * | 5/2004 | Pasadyn ....................... 700/100 |
| 7,027,953 B2 * | 4/2006 | Klein ........................... 702/184 |
| 7,058,590 B2 * | 6/2006 | Shan ............................ 705/7.29 |
| 7,072,863 B1 * | 7/2006 | Phillips et al. ............... 705/36 R |
| 7,080,026 B2 * | 7/2006 | Singh et al. .................. 705/7.31 |
| 7,080,290 B2 * | 7/2006 | James et al. .................. 714/47.2 |
| 7,200,505 B2 * | 4/2007 | Shan ............................ 702/76 |
| 7,523,034 B2 * | 4/2009 | Deligne et al. ............... 704/251 |
| 7,584,116 B2 * | 9/2009 | Kakouros et al. ............. 705/7.31 |
| 2001/0032029 A1 * | 10/2001 | Kauffman ..................... 700/99 |
| 2003/0018928 A1 * | 1/2003 | James et al. .................. 714/25 |
| 2003/0149648 A1 * | 8/2003 | Olsen et al. .................. 705/35 |
| 2004/0102937 A1 * | 5/2004 | Ibrahim ......................... 703/2 |
| 2004/0117183 A1 * | 6/2004 | Deligne et al. ............... 704/248 |
| 2005/0197875 A1 * | 9/2005 | Kauffman ..................... 705/7 |
| 2006/0074501 A1 * | 4/2006 | Hartman et al. .............. 700/29 |

OTHER PUBLICATIONS

Duncan, George, et al., Bayesian Forecasting for Seemingly Unrelated Time Series: Application to Local Government Revenue Forecasting, (Mar. 1993), Management Science, vol. 39, No. 3, pp. 275-293.*

Lai, T. and Shan. J., Efficient Recursive Algorithms for Detection of Abrupt Changes in Signals and Control Systems. (May 1999), IEEE Transactions on Automatic Control, vol. 44: No. 5, pp. 952-966.*

Košir, A. et al, Noise Variance Estimation Based on Measured Maximums of Sampled Subsets (2004), Mathematics and Computers in Simulation, vol. 65, pp. 629-639.*

(Continued)

*Primary Examiner* — Beth V Boswell
*Assistant Examiner* — Tiphany Dickerson

(57) ABSTRACT

Disclosed herein are systems and methods for forecasting with model-based PDF (probability density function) estimates. Some method embodiments may comprise: estimating model parameters for a time series, calculating a PDF for the time series, and generating a forecast from the PDF. The model parameters may comprise a variance for a hidden noise source, and the PDF for the time series may be based at least in part on an estimated variance for the hidden noise source.

11 Claims, 6 Drawing Sheets

OTHER PUBLICATIONS

Verbout, S. et al., Parameter Estimation for Autoregressive Gaussian-Mixture Processes: The EMAX Algorithm (Oct. 1998), IEEE Transactions on Signal Processing, vol. 46: No. 10, pp. 2744-2756.*

Jensen, Paul and Bard, Jonathan. "Time Series and Forecasting." Operations Research Models and Methods, Wiley, 2003, <http://www.me.utexas.edu/~jensen/ORMM/supplements/units/time_series/time_series.pdf>.*

"The ARIMA Procedure." SAS User's Manual (Version 8). Accessed from: http://web.archive.org/web/20040625085211/http://www.okstate.edu/sas/v8/saspdf/ets/chap7.pdf.*

* cited by examiner

METHODS AND SYSTEMS FOR FORECASTING WITH MODEL-BASED PDF ESTIMATES

BACKGROUND

Commercial enterprises compete for customers by promising, among other things, low prices and fast delivery. Successful competition often requires careful monitoring of profit margins and deadlines. One key to success in this environment is a system that provides accurate and timely business information. Financial data and other information that indicates the state of the corporation can no longer be examined only on a periodic basis, but rather must be continually monitored. Businesses rely on their latest performance information to support strategic planning and decision making, so any businesses without a system for providing accurate and timely business information would be at a huge disadvantage relative to their competitors.

Accordingly, most businesses track at least their financial data in a computerized financial reporting system that can generate reports on demand. Many large entities have reporting systems that process large numbers of complex transactions which may be occurring at many locations around the world.

Businesses often wish to use such computerized data to forecast some outcome (e.g., end-of-quarter revenue, end-of-month inventory, or end-of-year overhead costs) or to monitor the probability of achieving some goal to support current business decisions. This task may be quite challenging. A large enterprise's ongoing transactions are complex and difficult to model. One alternative to constructing transaction-based models is to employ stochastic modeling techniques for forecasting. Many stochastic modeling approaches are based on time-series models. Autoregressive (AR), moving average (MA), and autoregressive moving average (ARMA) models inherently assume that the data is stationary (in the statistical sense of having a fixed average and standard deviation), which makes them unsuitable for many real world applications. The autoregressive integrated moving average (ARIMA) model weakens the requirement for stationarity, requiring only that the data have a stationary derivative (i.e., a differenced time series that can be integrated to recover the original time series).

Real world data rarely follows any neat or closed-form stochastic models such as those given by the foregoing time-series models. Though a good correspondence can often be achieved with existing data that is used for training the model, the future predictions made by such models are inadequate for many applications, and degrade when model complexity is increased. An alternative approach to closed-form stochastic models would be desirable for forecasting in the business environment.

SUMMARY

Accordingly, there is disclosed herein systems and methods for forecasting with model-based PDF (probability density function) estimates. Some method embodiments may comprise: estimating model parameters for a time series, calculating a PDF for the time series, and generating a forecast from the PDF. The model parameters may comprise a variance for a hidden noise source, and the PDF for the time series may be based at least in part on an estimated variance for the hidden noise source.

BRIEF DESCRIPTION OF THE DRAWINGS

For a detailed description of illustrative embodiments, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various invention embodiments. The disclosed embodiments should not be interpreted, or otherwise used, as limiting the scope of the disclosure or the claims. In addition, one skilled in the art will understand that the following description has broad application. The discussion of any embodiments is meant only to be illustrative of those embodiments, and is not intended to suggest that the scope of the disclosure or the claims is limited to those embodiments.

In the ensuing discussion, a forecasting method described in related patent application U.S. application Ser. No. 10/959,861, filed Oct. 6, 2004, entitled "Methods and Systems for Cumulative Attribute Forecasting Using a PDF of a Current-to-Future Value Ratio," is used to provide context for the model-based PDF (probability density function) estimation techniques disclosed herein. The model-based estimation methods are not limited to this forecasting method, but rather are applicable to any PDF-based forecasting method.

Figure 1:
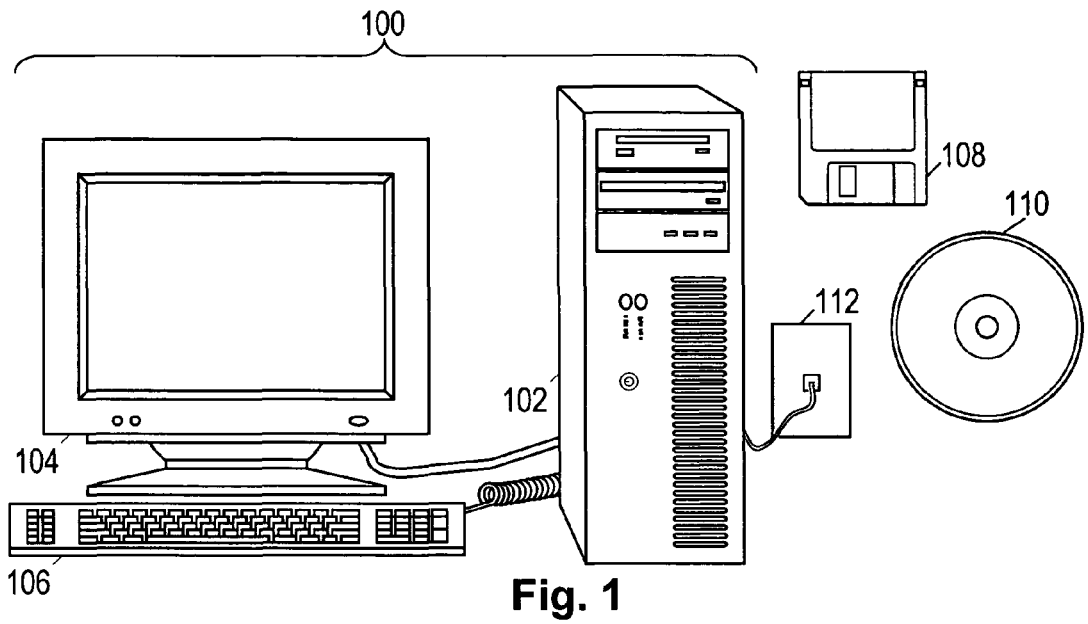
FIG. 1 is a diagram of an illustrative forecasting system with illustrative information carrier media in accordance with certain embodiments of the invention.

FIG. 1 shows an illustrative system 100 for Bayesian forecasting with model-based PDF estimation. System 100 is shown as a desktop computer 100, although any electronic device having some amount of computing power coupled to a user interface may be configured to carry out the methods disclosed herein. Among other things, servers, portable computers, personal digital assistants (PDAs) and graphing calculators may be configured to carry out the disclosed methods.

As shown, illustrative system 100 comprises a chassis 102, a display 104, and an input device 106. The chassis 102 comprises a processor, memory, and information storage devices. One or more of the information storage devices may store programs and data on removable storage media such as a floppy disk 108 or an optical disc 110. The chassis 102 may further comprise a network interface that allows the system 100 to receive information via a wired or wireless network, represented in FIG. 1 by a phone jack 112. The information storage media and information transport media (i.e., the networks) are collectively called "information carrier media."

The chassis 102 is coupled to the display 104 and the input device 106 to interact with a user. The display 104 and the input device 106 may together operate as a user interface. The display 104 is shown as a video monitor, but may take many alternative forms such as a printer, a speaker, or other means for communicating information to a user. The input device 106 is shown as a keyboard, but may similarly take many alternative forms such as a button, a mouse, a keypad, a dial, a motion sensor, a camera, a microphone or other means for receiving information from a user. Both the display 104 and the input device 106 may be integrated into the chassis 102.

Figure 2:
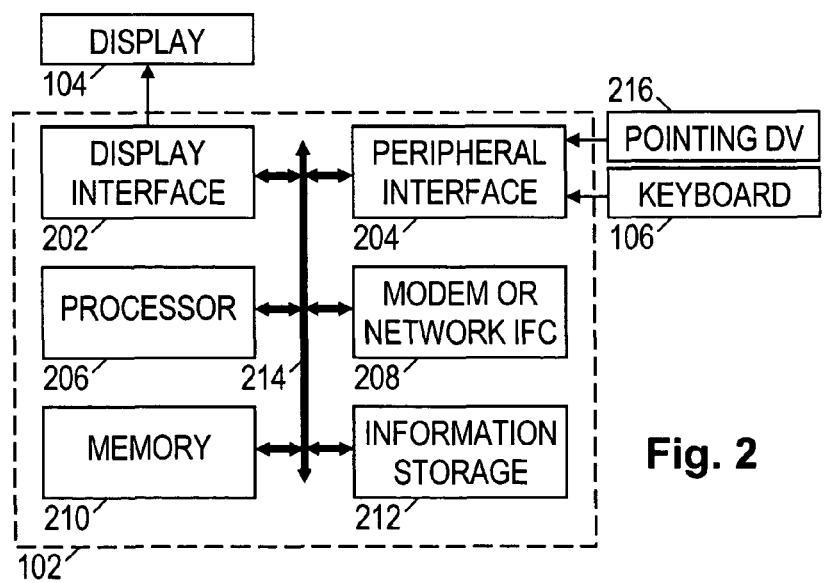
FIG. 2 is a block diagram of the illustrative forecasting system in accordance with certain embodiments of the invention.

FIG. 2 shows a simplified functional block diagram of system 100. The chassis 102 may comprise a display interface 202, a peripheral interface 204, a processor 206, a modem or other suitable network interface 208, a memory 210, an information storage device 212, and a bus 214. System 100 may be a bus-based computer, with the bus 214 interconnecting the other elements and carrying communications between them. The display interface 202 may take the form of a video card or other suitable display interface that accepts information from the bus 214 and transforms it into a form suitable for the display 104. Conversely, the peripheral interface 204 may accept signals from the keyboard 106 and other input devices such as a pointing device 216, and transform them into a form suitable for communication on the bus 214.

The processor 206 gathers information from other system elements, comprising input data from the peripheral interface 204, program instructions and other data from the memory 210, the information storage device 212, or from a remote location via the network interface 208. The processor 206 carries out the program instructions and processes the data accordingly. The program instructions may further configure the processor 206 to send data to other system elements, comprising information for the user which may be communicated via the display interface 202 and the display 104.

The network interface 208 enables the processor 206 to communicate with remote systems via a network. The memory 210 may serve as a low-latency temporary store of information for the processor 206, and the information storage device 212 may serve as a long term (but higher latency) store of information.

The processor 206, and hence the computer 100 as a whole, operates in accordance with one or more programs stored on the information storage device 212. The processor 206 may copy portions of the programs into the memory 210 for faster access, and may switch between programs or carry out additional programs in response to user actuation of the input device. The additional programs may be retrieved from information the storage device 212 or may be retrieved from remote locations via the network interface 208. One or more of these programs may configure system 100 to carry out at least one of the forecasting methods disclosed herein.

Figure 3:
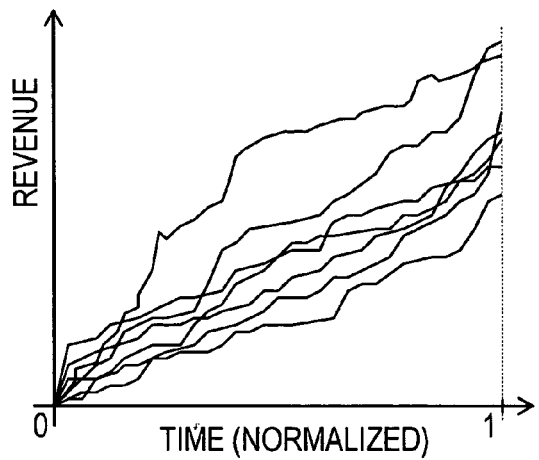
FIG. 3 shows illustrative graphs of cumulative revenue for multiple periods.

FIG. 3 is a graph showing revenue as a function of time for a number of past accounting periods. (The graphs are cumulative functions, but they are not necessarily strictly increasing functions since negative adjustments are possible.) Although revenue is shown, the methods disclosed herein may be applied to any profile, such as visits, transactions, sales, inventory, man-hours, costs, revenue, savings, liabilities, quantifiable risks, patents, licensees, customers, product demand, traffic patterns and network usage. The history of the attribute may be divided into time periods such as hours, days, weeks, months, quarters, years, or fiscal periods. The time periods may be fixed in length or they may vary from period to period. In the latter case, the time periods may be normalized before applying the disclosed methods. The choice of time periods may depend on the behavior being analyzed and the expected repetition patterns within such behaviors.

FIG. 3 shows that the profile varies from period to period, but there is some commonality to the patterns. The methods disclosed herein exploit this commonality in past periods to forecast future values in a current period. The forecasts are based on information from the current period and information from a dynamically adjusted subset of profiles from preceding periods.

Figure 4:
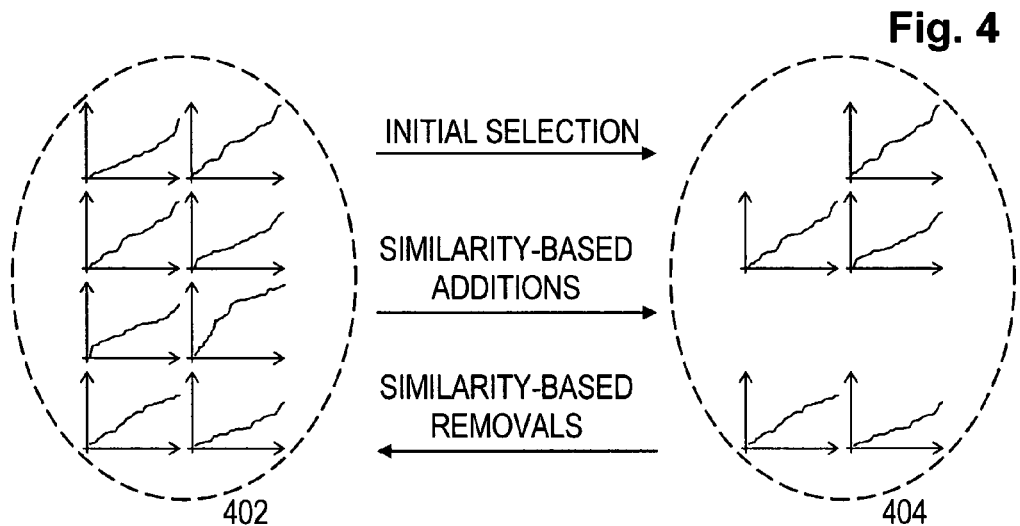
FIG. 4 shows an illustrative source profile set and an illustrative reference profile set.

FIG. 4 shows a source data set 402 and a reference data set 404. The reference data set 404 comprises profiles selected from the source data set 402. The contents of the reference data set 404 may be dynamically changed as new information becomes available.

In some embodiments, forecasting system 100 determines the reference set 404 in one of two modes, the mode being chosen based on the availability of information from a current period. If little or no information is available from the current period, the reference set 404 is determined based on initial selection rules. The initial selection rules employ information associated with the various profiles in the source data set 402 to construct the reference set 404. Once sufficient information becomes available from the current period, forecasting system 100 determines the reference set 404 based on a similarity measurement between the profile so far and the corresponding portions of the profiles in the source data set 402. Those profiles most similar to the current profile are placed in the reference data set 404. The reference sets determined by these embodiments are deterministic, in that the contents of the reference sets do not depend on the contents of any previous reference set.

In other embodiments, forecasting system 100 determines the reference set iteratively. An initial reference set 404 is determined using initial selection rules. Thereafter, the reference set is systematically updated, so that sufficiently similar profiles are added to the reference set, and sufficiently dissimilar profiles are removed. As before, the forecasting system 100 performs the similarity measurement by comparing the available profile information for the current period to the corresponding portions of the profiles in the source data set 402.

In both cases, the initial selection rules are designed to select profiles from source data set 402 that will be relevant to the current period. For example, if the current period is the second fiscal quarter of 2004, the relevant profiles may be the second quarter of the five preceding fiscal years. If only two years of data are available, the reference set may comprise all preceding fiscal quarters. The initial selection rules (and the similarity-based selection rules as well) are designed to ensure that the reference set 404 will comprise a sufficient number of profiles for subsequent processing. A minimum of three profiles may be required for subsequent processing, and some embodiments may require a larger minimum number of profiles in the reference set.

In some embodiments, the initial selection rules may be event-based. For example, if the forecasting is being performed for week-long periods, the selection rules may choose previous week profiles based on the existence of federal holidays, sales promotions, and weather forecasts. Thus if the current period will have a federal holiday, a 24-hour sales promotion, and a sunny weather forecast, the selection rules may select profiles from previous periods having a federal holiday, a 24-hour sales promotion, and forecasts for sunny weather as members of the reference set 404. If the reference set 404 is large enough, then the selection rules could exclude profiles from previous periods not involving all three of the foregoing factors.

Once enough information is available from the current period to make a similarity determination meaningful, the contents of the reference set 404 are determined or adjusted using a similarity measurement. Some embodiments may require that a predetermined fraction of the current period have elapsed before a similarity determination can be made, e.g., 5%. Other embodiments may simply require that a predetermined number of data samples exist before a similarity determination can be made, e.g., five daily revenue reports.

Figure 5:
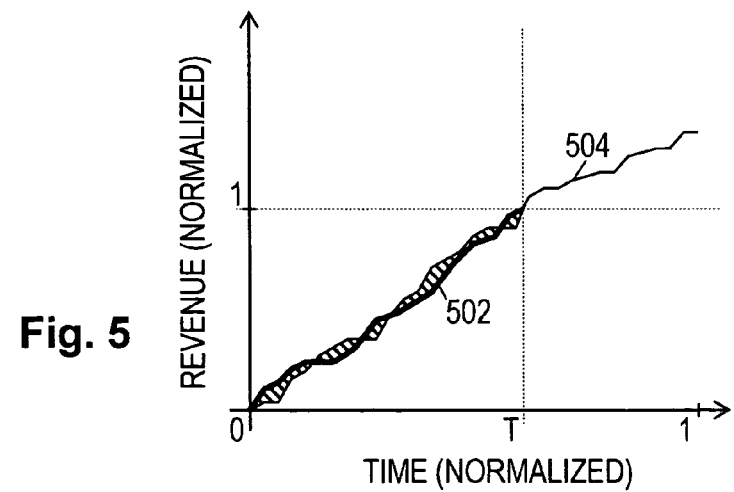
FIG. 5 shows an illustrative similarity measurement.

FIG. 5 shows an illustrative similarity measurement between a time series in a current period 502, and a time series from a previous period 504. If the length of the current and previous periods is different, the time scale may be normalized so that both periods have the same length. In some embodiments, the profile values themselves may be scaled so that the current value at time T is equal to the corresponding value in a previous period. A similarity measurement may be made using a distance calculation, which is represented by the shaded area in FIG. 5. The distance calculation may take the form of an integral or summation of the absolute value of the difference between the profiles, taken to some power. In equation form, the distance calculation may be expressed:

$$D_i = \left( \int_0^T |S(t) - S_i(t)|^p \, dt \right)^{1/p}, \quad (1)$$

where T is the current time, S(t) is the profile for the current period, $S_i(t)$ is the ith profile in the source data set 402, and p is a given integer greater than zero. Power p equals two for embodiments using a Euclidean distance measurement. A smaller distance indicates a greater similarity.

Once sufficient information from the current period is available, forecasting system 100 may periodically update or continuously update the reference set membership. (In this context, "continuously update" means that an update is performed each time the software is run.) As part of the update process, system 100 makes similarity calculations to compare the current period's profile to the corresponding portions of each profile in the source data set. In embodiments using the deterministic reference set embodiments, the similarity measurements may be sorted in order of decreasing similarity (increasing distance). A predetermined number of profiles from the beginning of the list may be comprised in the reference set by default. Thereafter, if any other profiles have a similarity (distance) greater than (less than) a predetermined threshold, these profiles are also included in the reference set.

In embodiments using the iterative reference set determination process, system 100 compares the similarity measurement for each profile not already in the reference set to a predetermined threshold. Those reference sets having a similarity greater than the predetermined threshold are added to the reference set 404. If the reference set 404 has more than a predetermined number of profiles, system 100 further compares the similarity measurements for the profiles already in the reference set to a second predetermined threshold. The second threshold may equal the first predetermined threshold, or may lower. Those profiles having a similarity measurement below the second predetermined threshold are removed from the reference set 404, so long as the number of profiles does not fall below a predetermined minimum.

Other similarity measurement methods may be used to construct the reference set. For example, in some embodiments a composite similarity measurement method is used. In the composite-similarity measurement, the distance measurement described previously is augmented with other factors. These other factors may comprise distance measurements between other curves associated with the profiles. For example, a revenue profile may have associated profiles for units sold and energy costs. Distances can be calculated between such curves associated with previous periods and corresponding curves associated with the current period. A weighted sum of these distance measurements can be used to obtain an overall similarity measurement.

Another similarity measurement method is a clustering procedure. The profile for the current period and each corresponding portion of the profiles in the source data set 402 can be represented by a multidimensional vector (each data sample is a vector component). A clustering algorithm is applied to the set of multi-dimensional vectors to automatically divide them into clusters. (In some embodiments, each of the vectors may be scaled to a predetermined energy before the clustering algorithm is applied.) The reference set 404 is then determined to be those profiles having vectors in the same cluster as the profile for the current period.

Having determined a suitable reference set, system 100 uses the reference set to forecast a future value in the current period. An illustrative forecasting method is described in greater detail below. Before discussing the forecasting method further, however, time-series model estimation method is described.

Figure 6:
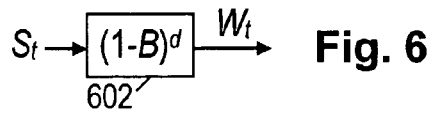
FIG. 6 shows an illustrative differencing technique for use with non-stationary time series in accordance with certain embodiments of the invention.

The profiles shown in FIG. 3 each represent a discrete time series. Let $S_t$ represent the profile as a function of time t as the time ranges in discrete steps from t=0 to the end of the period t=T. The time series is non-stationary, in that the mean and variance of the time series change as a function of time. However, high-order derivatives of such non-stationary series often prove to be stationary, and hence amenable to analysis. Accordingly, FIG. 6 shows a differentiating operation that is applied to the time series to obtain a stationary time series $W_t$. Block 602 implements the differencing operation represented by:

$$W_t = (1-B)^d S_t \quad (2)$$

where B is the unit delay operator, and d is the order of the derivative (d=1 is first-order, d=2 is second order, etc.). When d=1, block 602 implements a first-order difference:

$$W_t = (1-B)S_t = S_t - S_{t-1} \quad (3)$$

Time series $W_t$ is evaluated for stationarity, starting with d=0 and proceeding for increasing values of d until a stationary time series is found.

A number of tests exist for determining if a given time series is stationary. G.E.P. Box, G. M. Jenkins, and G. C. Reinsel, on p. 185 of *Time Series Analysis: Forecasting and Control*, 3d, © 1994 Prentice-Hall, ("Box and Jenkins") suggest that a sequence may be considered to be non-stationary if its estimated autocorrelation function fails to die out rapidly (in the first 20 or so autocorrelation coefficients). Thus, in some embodiments, the autocorrelation function of time series $W_t$ may be evaluated and used to judge the stationarity of the time series. Another stationarity test is the one based on Jackknife method. In this stationarity test, the time series is divided into multiple segments. For each segment, the sample mean, sample variance and sample autocorrelation functions are computed. The computed sample metrics obtained from all the individual segments are compared in a formal test for stationarity. Thus, in some embodiments, the Jackknife method may be used to judge the stationarity of the time series. Other suitable stationarity tests exist in the current literature. The KPSS (Kwiatkowski-Phillips-Schmidt-Shin) Test, the Runs Test, the ADF (Augmented Dickey-Fuller) Test, and the PP (Phillips-Perron) Test are examples of suitable stationarity tests that may be employed in various embodiments. No matter what methods or approaches are used to test stationarity, if the time series is found to be nonstationary, the differentiation process may be repeated with a higher value of d.

Figure 7:
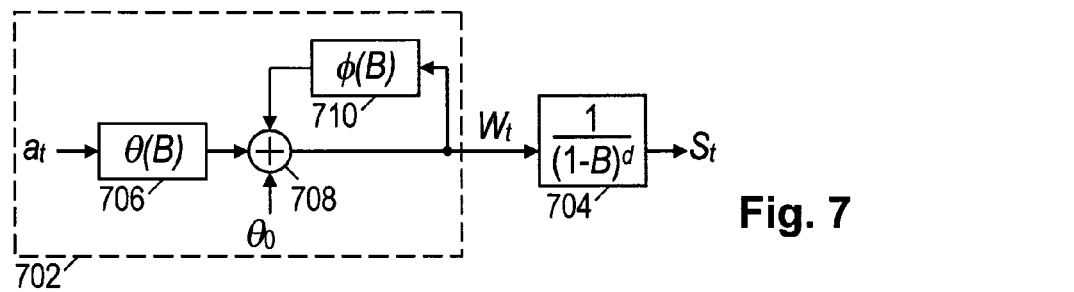
FIG. 7 shows an illustrative model for a time series in accordance with certain embodiments of the invention.

Assuming a stationary derivative can be found, the time series $S_t$ can be modeled as shown in FIG. 7. A mixed autoregressive moving average (ARMA) model 702 produces stationary time series $W_t$ from a hidden white noise source $a_t$. An integration module 704 then integrates stationary time series $W_t$ to produce the observed time series $S_t$.

Returning to model 702, the hidden noise source $a_t$ is assumed to have zero mean and variance $\sigma_\alpha^2$. A moving average filter 706, a summation element 708, and an autoregressive filter 710 operate on the hidden noise source to produce the stationary time series $W_t$ in accordance with the equation:

$$\phi(B)W_t = \theta_0 + \theta(B)\alpha_t \quad (4)$$

where $\theta(B)$ is a p-order polynomial of delay operator B, representing the operation of filter 706, where $\phi(B)$ is a q-order polynomial of delay operator B, representing the operation of filter 710, and $\theta_0$ is an offset added by summation element 708. The leading coefficient of each polynomial is assumed to be unity, so the total number of parameters for model 702 is p+q+2, comprising the filter coefficients, offset $\theta_0$, and variance $\sigma_\alpha^2$. (The differencing parameter d may also be considered as an additional model parameter.)

Figure 8:
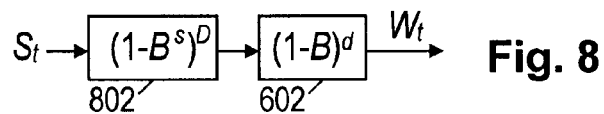
FIG. 8 shows an illustrative differencing technique for use with non-stationary time series exhibiting seasonal effects, in accordance with certain embodiments of the invention.

Box and Jenkins also teach a seasonal model that may be preferred when clear seasonal patterns are evident in the time series. In the seasonal model, a stationary time series is sought by differencing at two levels: a local level and a seasonal level. FIG. 8 shows a differentiating operation that accounts for seasonal effects by implementing the following operation:

$$W_t = (1-B^s)^D (1-B)^d S_t \quad (5)$$

where B is the unit delay operator, s is the length of the season, and D and d are the respective derivative orders. When D=1, block 802 implements a first-order seasonal difference:

$$W_t = (1-B_s)S_t = S_t - S_{t-s}. \quad (6)$$

The season length s may be determined by the methods disclosed in U.S. application Ser. No. 11/001, entitled "Methods and Systems for Identifying Recurrent Patterns," by inventor Jerry Shan. Time series $W_t$ is evaluated for stationarity, starting with D=d=0 and proceeding for increasing values of D and d until a stationary time series is found.

Figure 9:
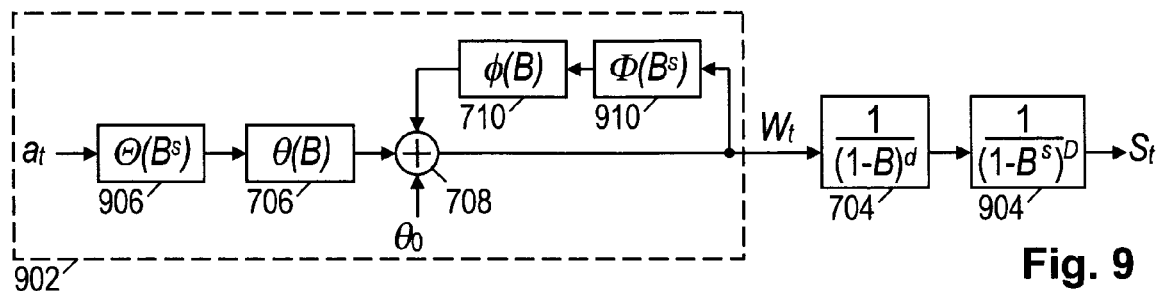
FIG. 9 shows an illustrative model for a time series exhibiting seasonal effects, in accordance with certain embodiments of the invention.

FIG. 9 shows an illustrative seasonal model for time series $S_t$. In the ARMA model, each of the filters 706 and 710 is supplemented by a seasonal filter 906 and 910, respectively. Filter 906 is a moving average filter of order P, and filter 910 is configured as an autoregressive filter of order Q. The integration module 704 is similarly supplemented by a seasonal integration module 904. The number of parameters in the seasonal model is P+p+Q+q+3, comprising the filter coefficients, seasonal length s, offset $\theta_0$, and variance $\sigma_\alpha^2$. (The differencing orders D and d may also be considered as additional model parameters.)

Box and Jenkins outline a number of useful methods for estimating the parameters of the foregoing time series models in chapters 7 and 9 of their book, comprising at least Nonlinear Estimation and Bayesian Estimation. These methods are illustrative and not limiting. These methods may be used to estimate model filter coefficients, offsets, and noise variances that in turn provide information suitable for estimating probability density functions (PDFs) for time series $S_t$. Once estimated, such PDFs may be used for forecasting $S_t$ values with greater accuracy.

Figure 10:
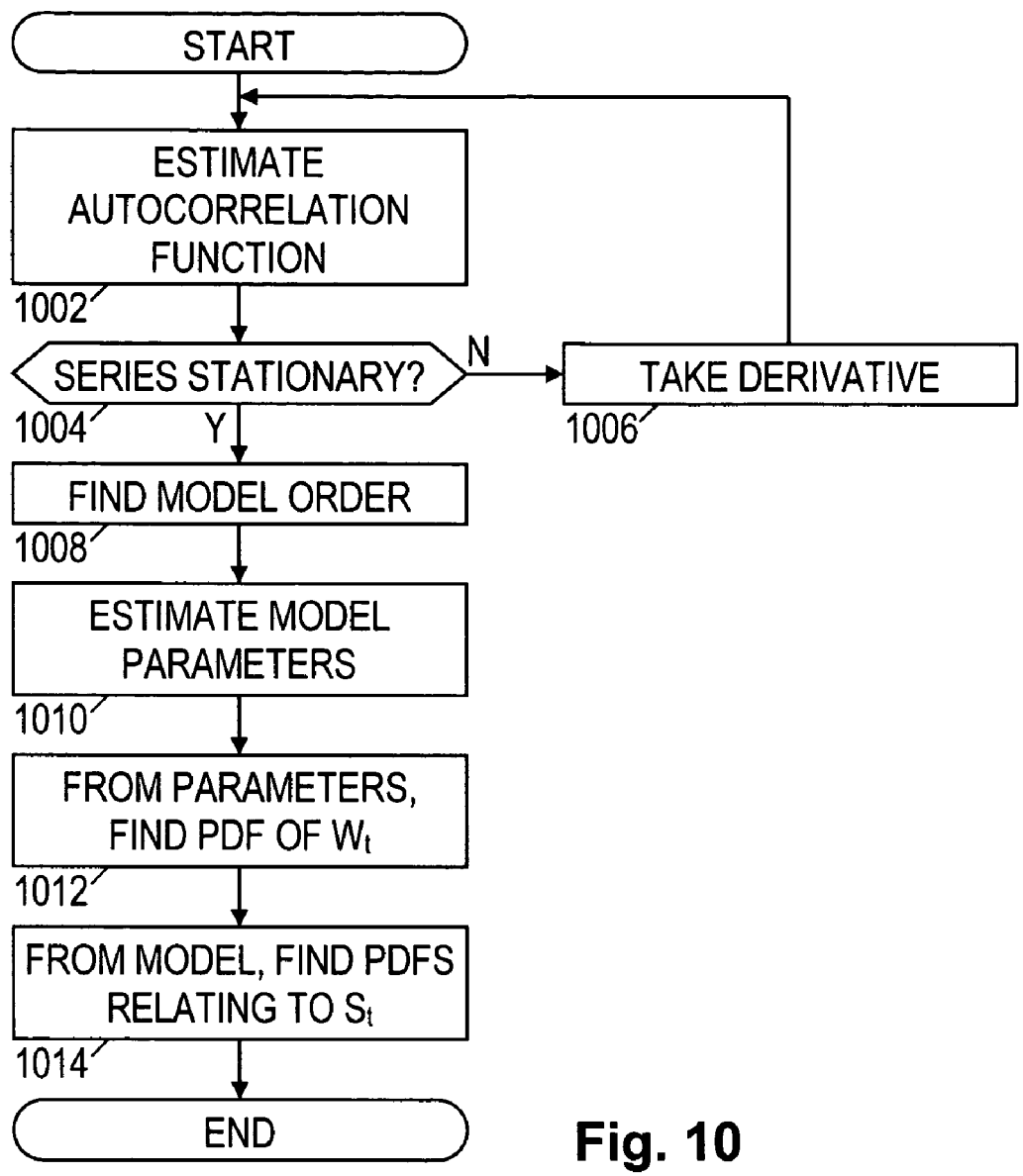
FIG. 10 is a flow diagram of an illustrative model-based PDF estimation technique in accordance with certain embodiments of the invention.

FIG. 10 shows a flow diagram of an illustrative method for finding PDFs of a time series $S_t$. Beginning in block 1002, system 100 estimates an autocorrelation function for the time series. One way to estimate the autocorrelation function is described on p. 31 of Box and Jenkins. In block 1004, system 100 determines whether the autocorrelation function is indicative of a stationary time series, i.e., whether the autocorrelation function dies out as the lag increases. If not, then in block 1006, system 100 performs a differencing operation on the time series. Blocks 1002-1006 may be repeated until a stationary time series is obtained.

In block 1008, system 100 determines a model order (i.e., values for p and q in the non-seasonal model). Box and Jenkins describe a number of suitable techniques for estimating model order in Chapter 5, comprising at least an exponential-decay test for the autocorrelation function and the partial autocorrelation function, a canonical correlation method, and AIC (Akaike Information Criterion) and BIC (Bayesian Information Criterion) model selection criteria proposed by Akaike and Schwarz. Any of these or other suitable methods may be used.

In block 1010, system 100 estimates the ARMA model parameters. System 100 may employ the Nonlinear Estimation method or the Bayesian Estimation method noted above, or some other suitable method may be used. The ARMA model comprises a hidden noise source at having a Gaussian or other probability density function. Once the noise source's variance has been determined, the estimated filter coefficients and offsets can be used in block 1012 to determine the PDF for the stationary time series $W_t$. (Some embodiments of system 100 may assume a Gaussian PDF and calculate the mean and variance from the estimated model parameters.)

In block 1014, system 100 uses the PDF determination for the stationary time series to estimate the PDF for the original time series $S_t$. Note that the PDF for the original time series is expected to vary as a function of time.

The PDF determination method of FIG. 10 is expected to yield good initial probability density function estimates that can then be used to provide accurate forecasts. Illustrative methods are disclosed in U.S. patent application Ser. No. 10/959,861, entitled "Methods and Systems for Cumulative attribute Forecasting Using a PDF of a Current-to-Future Value Ratio" by inventors Jerry Shan and Hsiu-Khuern Tang. For context, these illustrative methods are explained further below.

Figure 11:
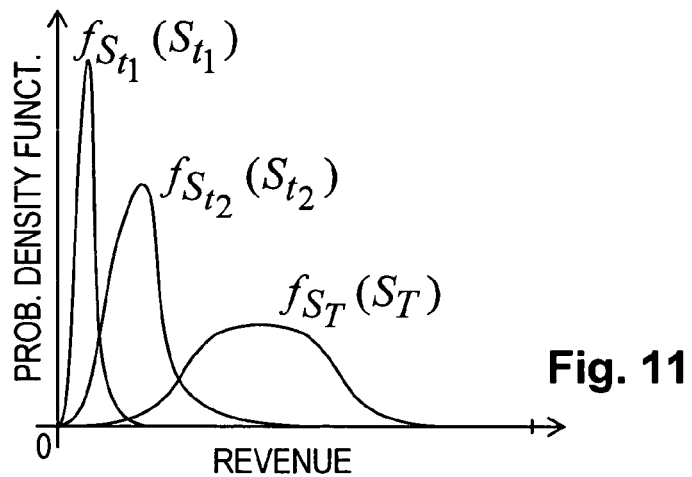
FIG. 11 shows illustrative graphs of unconditional probability density functions for revenue at different times in accordance with certain embodiments of the invention.

In the following discussion, let $S_t$ represent the cumulative attribute as a function of time t as the time ranges from t=0 to the end of the period t=T. The cumulative attribute $S_t$ is a stochastic variable having a probability density function $f_{S_t}(S_t)$ that varies as a function of time. Let $f_{S_T}(S_T)$ represent the probability density function for $S_T$, the value of the cumulative attribute at the end of the period. (It is this end-of-period value that we may wish to forecast.) FIG. 11 shows an illustrative evolution of the probability density function, giving curves at $t=t_1$, $t=t_2$, and $t=T$.

The probability density functions shown in FIG. 11 can be determined by modeling the profiles in reference set 404 as described above. As discussed in the related application, a forecast for the end-of-period value could be made simply by using $f_{S_T}(S_T)$. However, FIG. 3 suggests that a more accurate forecast may be possible if intermediate values are available and are taken into account. For example, if at the middle of the period, the current attribute value is near the high end of the range, then the end-of-period value is more likely to be near the high end of the range. Conversely, a low current attribute value makes a low end-of-period value more likely. Accordingly, the following discussion concerns a determination of the conditional probability density function $f(S_T|S_t)$, i.e., the probability distribution for the end-of-period attribute value $S_T$ when the current attribute value $S_t$ is known.

Bayes' formula for a conditional probability gives:

$$f(S_T|S_t) = \frac{f(S_t, S_T)}{f_{S_t}(S_t)}. \tag{7}$$

Unfortunately, the joint probability density function $f(S_t,S_T)$ is difficult to estimate with a limited amount of historical data. However, the joint probability density function can be expressed using Bayes' formula again:

$$f(S_T|S_t) = \frac{f(S_t|S_T)f_{S_T}(S_T)}{f_{S_t}(S_t)}. \tag{8}$$

Equation (8) raises another difficulty, namely, in determining the conditional probability density function on the right-hand side of the equation, the end-of-period value $S_T$ cannot be taken as known until the end of the period, at which point forecasting is unnecessary. Thus equation (8) needs to be revised to eliminate this source of circularity.

Figure 12:
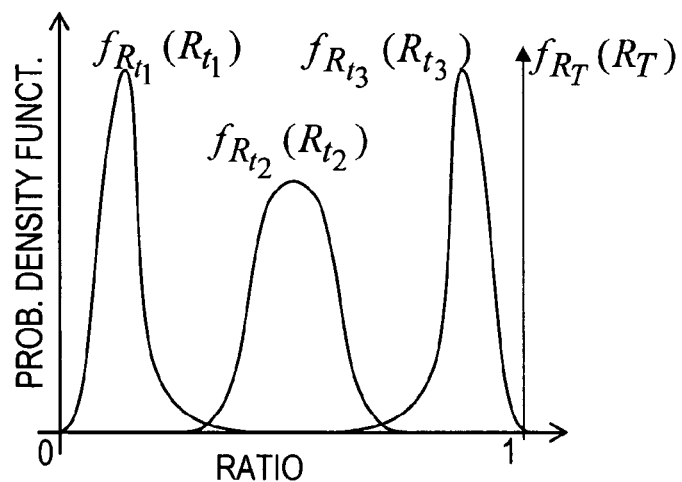
FIG. 12 shows illustrative graphs of unconditional probability density functions for ratios at different times in accordance with certain embodiments of the invention.

The present disclosure exploits a reformulation of the conditional probability density function $f(S_t|S_T)$ as follows:

$$f(S_t|S_T) = \frac{1}{S_T}f_{R_t}(R_t|S_T) = \frac{1}{S_T}f_{R_t}(S_t/S_T|S_T), \tag{9}$$

where the random variable has been scaled to obtain the ratio $R_t = S_t/S_T$. Advantageously, the probability distribution for the ratio $R_t$ (see examples shown in FIG. 12) has been tested to be practically independent of the end-of-period value $S_t$ in the cumulative attributes considered by the authors. Thus it can be shown that $$f(S_T|S_t) = \frac{1}{S_T}\frac{f_{R_t}(S_t/S_T)f_{S_T}(S_T)}{f_{S_t}(S_t)}. \tag{10}$$

When forecasting, the current attribute value $S_t$ is fixed, so the denominator can be dropped in favor of a proportionality constant, giving:

$$f(S_T|S_t) \propto \frac{1}{S_T}f_{R_t}(S_t/S_T)f_{S_T}(S_T), \tag{11}$$

where $\propto$ represents proportionality. If needed, the proportionality constant can simply be determined by integration since the area under any probability density function is always equal to unity. Note that if the independence requirement between the ratio and the end-of-period value cannot be fully tested and satisfied, one can still use equation (11) for practical purposes, with the understanding that it is an approximation.

In any event, equation (11) provides a relationship that can be used for forecasting an end-of-period attribute value $S_T$ with knowledge of a current attribute value $S_t$, the unconditional probability density function for the ratio $R_t$, and the unconditional probability density function for the end-of-period attribute value $S_T$. Advantageously, with the modeling techniques disclosed herein these unconditional probability density functions can be derived with only a limited amount of historical information.

Figure 13:
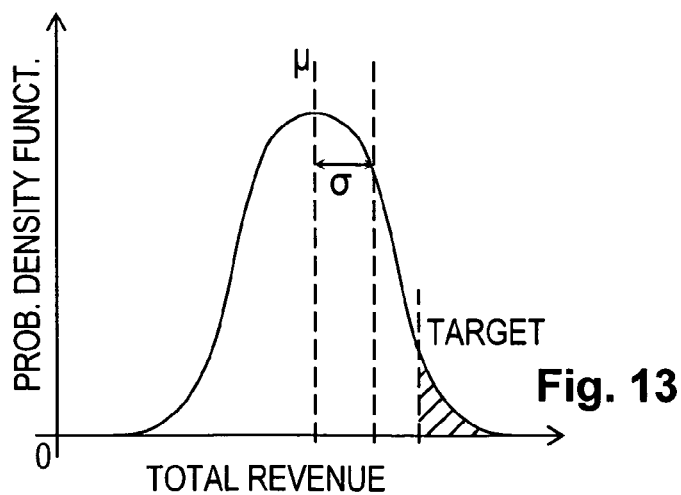
FIG. 13 is a graph of an illustrative conditional probability density function derived by certain embodiments of the invention.

In making a forecast, system 100 determines the unconditional probability density functions for intermediate and end-of-period cumulative attribute values, $f_{R_t}(R_t)$ and $f_{S_T}(S_T)$, respectively. System 100 identifies the current cumulative attribute value $S_t$ and its associated time t, and combines these to evaluate equation (11) for different potential values of $S_T$. This results in a curve such as that shown in FIG. 13. From this curve, system 100 can determine one or more values of interest. The curve's maximum occurs at the most likely end-of-period cumulative value. In a Gaussian curve, the maximum is at the mean $\mu$, as shown in FIG. 13. However, the curve is not necessarily Gaussian, and the most-likely value may be different than the mean. In a multi-mode distribution, there may be more than one local maximum (each local maximum is called a mode). Thus, values of interest to be determined by the computer may comprise the mean and the mode(s). Where a single-mode distribution is encountered, the values of interest may be the mean and the standard deviation $\sigma$. In some applications, the values of interest may define a range, e.g., a two-sided range around the most-likely value that contains 80% of the area under the curve. In other applications, the value of interest may be a probability of exceeding a target, as represented by the shaded area in FIG. 13. Each of these values of interest can be determined using numerical techniques.

The foregoing discussion is directed to forecasting values of interest relating to a cumulative attribute at the end of a period. However, the method can be readily modified to provide forecasting of any future value within the period. The derivation and mathematics proceed as before, with a simple substitution of $S_{t2}$ for $S_T$, where $t_2 \leq T$.

Figure 14:
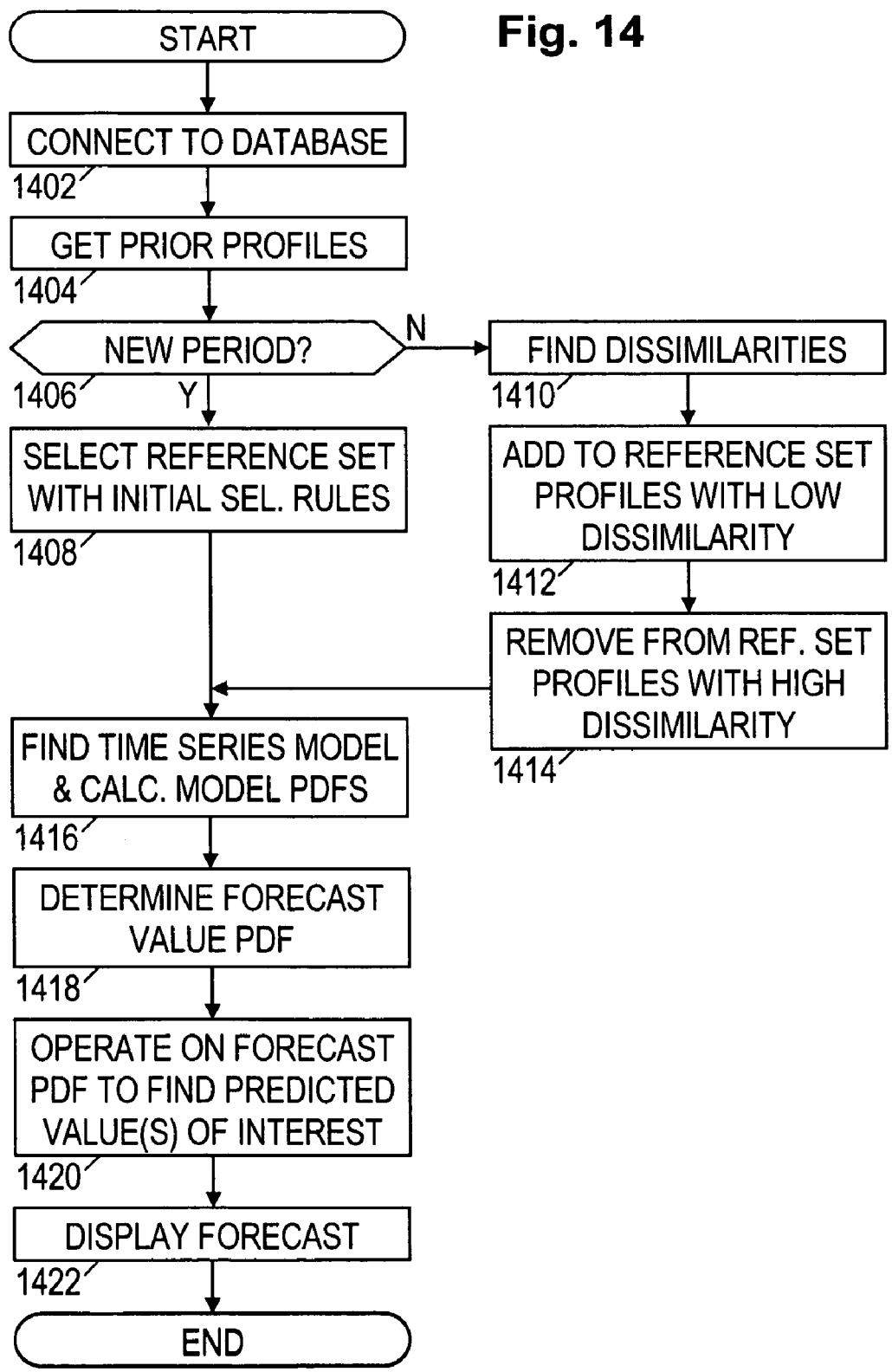
FIG. 14 is a flow diagram of an illustrative Bayesian forecasting method in accordance with certain embodiments of the invention.

FIG. 14 shows a flow diagram for an illustrative computer-based implementation of a forecasting method using a dynamic reference set. Beginning with block 1402, system 100 connects to a database having profile records for current and past periods. In block 1404, the forecasting system gathers profiles and associated information for previous periods. In block 1406, the system determines whether a new period has begun, i.e., whether there is insufficient information about the current period to perform similarity measurements. If so, system 1408 determines the reference set of profiles by applying initial selection rules to the information associated with the profiles. Otherwise, if system 100 determines that sufficient information is available from the current period to tailor the reference set, then in block 1410 the system performs a distance (dissimilarity) calculation between the current profile and corresponding portions of each profile from a previous period. In block 1412, system 100 adds to reference set 404 any profiles having a small distance that are not already in the reference set. In block 1414, system 100 removes from reference set 404 any profiles having a large distance measurement. (This removal may be subject to a requirement that reference set 404 comprise at least some minimum number of profiles.) The determination of "small" and "large" distances may be made by comparing the distance measurements to respective predetermined thresholds. In one embodiment, the threshold for a small distance threshold is a Euclidean distance measurement of less than 20% of the current profile's energy, and a large distance threshold is a Euclidean distance measurement of more than 30% of the current profile's energy. Having determined the reference set in either block 1408 or 1414, system 100 moves to block 1416.

In block 1416, system 100 operates on the profiles in the reference set (and information from the current period) to estimate model parameters and determine PDFs for the profiles. In block 1418, system 100 uses the PDFs to generate a forecast value PDF as provided in equation (11). In block 1420, system 100 operates on the forecast value PDF to determine value(s) of interest, and in block 1422, system 100 displays the values of interest to the user as a forecast. The forecast display may take the form of an image on a screen or on paper, sound communicated audibly to the user, and/or a tactile pattern made sensible to the user. The forecast may simply be a most-likely end-of-period value. The forecast may comprise a standard deviation, a range, or some indication of confidence in the forecast value. The forecast may be a likelihood of exceeding (or failing to reach) a target value. The forecast may be a graph of the conditional probability density function for the end-of-period value. The foregoing examples are illustrative and not limiting.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of illustrative embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer-readable storage medium storing a program that, when executed by a processor, causes the processor to:
   select a reference set of profiles from previous periods;
   estimate model parameters of a time series based on the reference set, wherein the model parameters comprise a first variance for a hidden noise source;
   calculate a probability density function for the time series including determining a second variance for the probability density function based at least in part on the first variance for the hidden noise source; and
   generate a forecast from the probability density function.

2. The computer-readable storage medium of claim 1, wherein when the processor estimates, the program further causes the processor to differentiate the time series to obtain a stationary time series.

3. The computer-readable storage medium claim 1, wherein when the processor estimates, the program further causes the processor to estimate using model parameters comprising coefficients of a moving average filter.

4. The computer-readable storage medium of claim 1, wherein when the processor estimates, the program further causes the processor to estimate using model parameters comprising coefficients of an autoregressive filter.

5. The computer-readable storage medium of claim 1, wherein when the processor estimates, the program further causes the processor to estimate using model parameters comprising an offset value.

6. The computer-readable storage medium of claim 1, wherein when the processor estimates, the program further causes the processor to estimate using model parameters where the model accounts for recurring patterns in the time series.

7. The computer-readable storage medium of claim 1, wherein when the processor calculates, the program further causes the processor to calculate a Gaussian probability density function.

8. The computer-readable storage medium of claim 1, wherein when the processor calculates, the program further causes the processor to calculate the probability density function being a function of time.

9. The computer-readable storage medium of claim 1, further comprising:
   wherein when the processor estimates the time series, the program further causes the processor to estimate the time series representing a cumulative value; and
   wherein when the processor generates the forecast, the processor generates the forecast being an end-of-period cumulative value.

10. A computer comprising:
    a display;
    a processor coupled to the display; and
    a memory coupled to the processor,
    wherein the memory stores software that configures the processor to:
      select reference profiles from a set of profiles from previous periods;
      estimate a time series based on the reference profiles and a profile of the current period; and
      derive a probability density function for the time series by estimating parameters of a model that comprises a hidden noise source,
    wherein the software configures the processor to determine a first variance for the hidden noise source, and wherein the software further configures the processor to determine a second variance for the probability density function from the first variance of the hidden noise source and from estimated filter coefficients.

11. The computer-readable storage medium of claim 1 wherein when the processor changes the profiles, the program further causes the processor to perform a dissimilarity calculations between the profile of the current period, and to change the profiles in the reference set based on the dissimilarity calculations.

* * * * *

UNITED STATES PATENT AND TRADEMARK OFFICE
CERTIFICATE OF CORRECTION

PATENT NO. : 8,180,664 B2  
APPLICATION NO. : 11/001453  
DATED : May 15, 2012  
INVENTOR(S) : Jerry Z. Shan Page 1 of 1

It is certified that error appears in the above-identified patent and that said Letters Patent is hereby corrected as shown below:

In column 8, line 12, delete "11/001," and insert -- 11/001,458 --, therefor.

In column 12, line 20, in Claim 3, delete "medium" and insert -- medium of --, therefor.

Signed and Sealed this
Twenty-fifth Day of December, 2012

David J. Kappos
*Director of the United States Patent and Trademark Office*